United States Patent [19]

Janssen et al.

[11] Patent Number: 4,918,757

[45] Date of Patent: Apr. 24, 1990

[54] HEARING AID HEADBAND SUPPORT

[76] Inventors: Gwen V. Janssen, 837 N.W. 10, Oklahoma City, Okla. 73106; Roy C. Rowland, 603 Sunnybrook, Edmond, Okla. 73034

[21] Appl. No.: 303,435

[22] Filed: Jan. 30, 1989

[51] Int. Cl.[5] .......................... A42B 1/00; G02C 11/06

[52] U.S. Cl. .......................................... 2/171; 2/209.3; 2/DIG. 6; 2/DIG. 11; 381/68.3; 381/69

[58] Field of Search ............ 2/171, DIG. 11, DIG. 6, 2/209.3; 381/68.3, 68.5, 68.7, 69, 69.2, 68

[56] References Cited

U.S. PATENT DOCUMENTS

Re. 25,059 10/1961 Lewis ................................ 381/68.3
2,179,615 11/1939 Craig ................................ 381/68.3
2,647,955 8/1953 Stalcup .............................. 381/69.2
4,317,238 3/1982 Amin .......................... 2/DIG. 11 X
4,365,354 12/1982 Sullivan ............................. 2/171 X
4,665,566 5/1987 Garrow .................................. 2/171
4,719,651 1/1988 Tereshinski ................ 2/DIG. 11 X

FOREIGN PATENT DOCUMENTS 1276731 10/1961 France ................................ 381/69

*Primary Examiner*—Peter Nerbun
*Attorney, Agent, or Firm*—Robert K. Rhea

[57] ABSTRACT

In a hearing aid support, an elongated adjustable headband surrounds the head from the forehead hairline in the vicinity of the ears to the nape of the neck. Strip forming slits in the headband at the predetermined position of the skull bone support a bone conduction oscillator to make contact with the mastoid bone.

4 Claims, 1 Drawing Sheet

HEARING AID HEADBAND SUPPORT

BACKGROUND OF THE INVENTION

1.. Field of the invention.

This invention relates to hearing aids and more particularly to a headband supporting either air or bone conduction hearing aids.

Some hard of hearing adults and children whose hearing problem can be improved or solved by the use of a hearing aid sometimes have very difficult hearing aid fitting or wearing problems, for example, Treacher-Collins, Down's Syndrome, Atresia or other difficult to fit ears.

This invention obviates many of the hearing aid fitting problems associated with the above named problem ears by providing a support with an adjustable head encircling band adapted for adjustment in head size changes and providing retaining members for supporting a particular or desired type of hearing aid.

2. Description of the prior art.

Prior patents generally disclose body encircling bands which support components of an individual hearing aid system, for example a battery or transmitter unit. Some prior art devices disclose an apparatus for supporting the hearing aid components on the individual's head as for example, in or under a hat worn by the hearing aid user.

This invention is distinctive over prior art hearing aid supports by providing a head surrounding band which will accommodate substantially any in-the-ear or behind-the-ear hearing aid units presently available for either adults or children.

SUMMARY OF THE INVENTION

A band formed from selected flexible material having a length in accordance with the size of the head to be encircled and a width sufficient to transversely support in or behind-the-ear conventional hearing aid units is provided with cooperating self-adhering material intermediate its length and at its respective end portions to be overlapped and surround a user's head. At a selected location or locations intermediate its ends the band is longitudinally slit to provide offset longitudinally extending strips partially surrounding and secured to a transversely disposed flexible tube, the tube or tubes each at least partially surrounding a hearing aid unit.

The principal objects of this invention are to support in proper fitting relation hearing aids for individuals including those with the above named difficult to fit ears of the bone oscillator, contralateral behind-the-ear aids, air receivers with body style hearing aids, monaural or binaural behind-the-ear aids in which each individual is accurately fitted and in which the headband and its supports may be adjusted for comfort and changes in head sizes of young persons.

DESCRIPTION OF THE PREFERRED EMBODIMENTS

Figure 1:
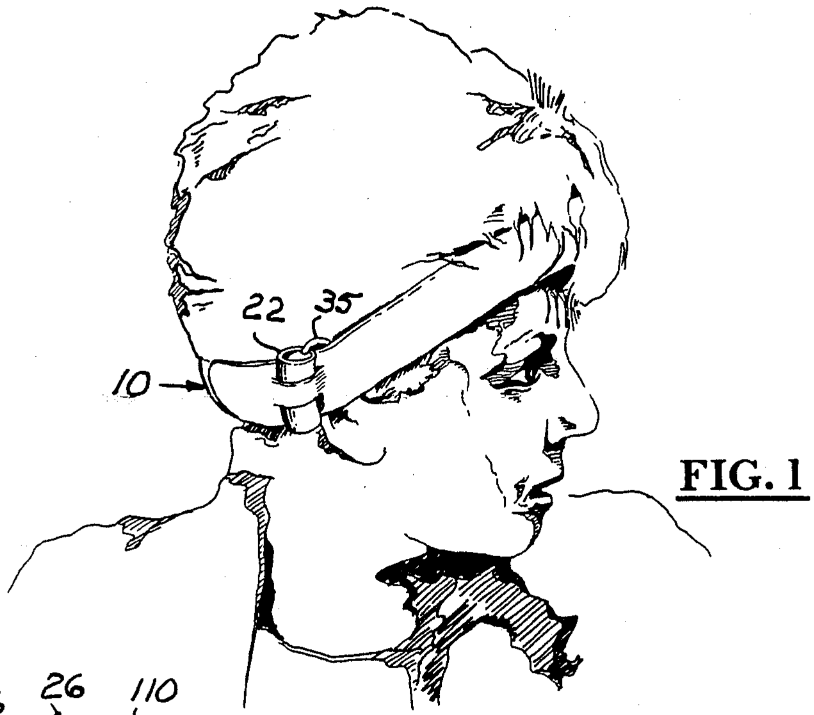
FIG. 1 is a perspective illustration of the headband in operative wearing position.

Like characters of reference designate like parts in those figures of the drawings in which they occur.

In the drawings:

Reference numeral 10 indicates the headband as whole which is a elongated strap-like in general configuration. The headband 10 is formed from fabric, leather or plastic material having a length sufficient to encircle, with overlapping end portions, the head of a user from the forehead hairline to the center back base of the head or nape of the neck.

The width of the headband 10 is selected in accordance with the length of the hearing aid unit to be supported as hereinafter explained. At measured positions, as presently explained, from its center and respective ends the headband is longitudinally split a predetermined distance intermediate its width as at 12–14 and 12′–14′. The slits are spaced apart a distance substantially equal to one-third the transverse width of the headband 10 to form central narrow bands or strips 16–16′ and lateral strips 18–20 and 18′–20′, respectively, at opposite sides of the center strips.

The purpose of the three strips adjacent each end portion of the headband is to partially surround a medial and respective end portion of a resilient material tube 22–22′ when threaded through the slits forming the respective strips. The length of the tubes 22–22′ is substantially equal to the transverse width of the headband 10. The bore of each tube is dimensioned to resiliently grip the exterior surfaces of a hearing aid when disposed therein. Each of the tubes 22–22′ has its wall fastened as by rivets 24 to the strips 18–20 and 18′–20′ respectively to prevent separation of the respective tubes from the headband 10. In addition to supporting the respective tubes 22–22′ the purpose of the tube partially surrounding strips is to support and provide direct contact of a hearing aid, such as a bone conductor oscillator type hearing aid 26, in which the bone oscillator 28 thereof projects through a tube opening 29 so that the surface of the oscillator 28 is substantially in the plane of the headband strips adjacent the mastoid bone. The tube 22′ is also apertured diametrically opposite its aperture nesting the bone oscillator, as at 30, for nesting joined sections of material 31 and 32 forming a desired thickness such as self-adhering oppositely disposed sections of material presently marketed under the trademark Velcro. The section 31 is similarly secured to the hearing aid 26 opposite the oscillator 28 to register with the tube aperture 30 and the section 32 is secured to the surface of the strip 16–16′ in register with the aperture 30. The purpose of the Velcro sections 31 and 32 is to anchor the hearing aid to the headband in a desired position and insure that the center headband strip 16′ maintains contact between the bone oscillator 28 and the patient's skull or mastoid bone position. Similarly the tube 22–22′ supports a behind-the-ear hearing aid 34 which is supported in the tube 22 or 22′ by its hood 35 connected by its hook, with an ear plug, not shown.

Each end portion of the headband 10 is provided with cooperating sections of Velcro material 36 and 38 secured thereto as by stitching, not shown, for the purpose of removably securing the headband in place on the user.

Figure 5:
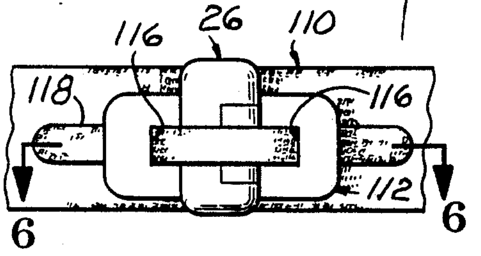
FIG. 5 is a fragmentary elevational view of an alternative headband.
Figure 6:
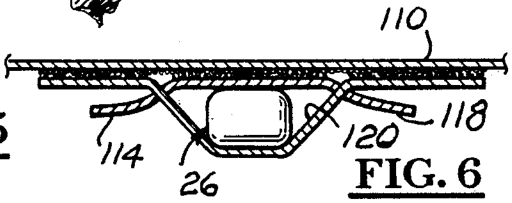
FIG. 6 in a horizontal sectional view taken substantially along the line 6—6 of FIG. 5.
Figure 2:
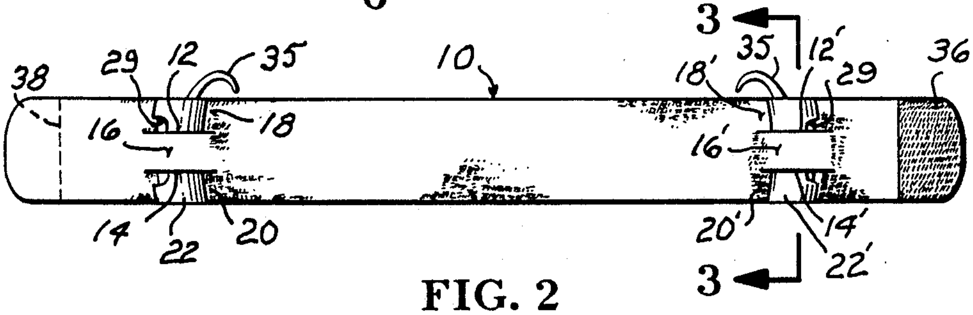
FIG. 2 is a plan view of the extended hearing aid supporting band.

Referring now to FIGS. 5 and 6 the numeral 110 indicates an intermediate portion of an alternative headband for selectively supporting along its length a patch means 112. The patch means, when attached to the headband 110, temporarily supports, for testing purposes a behind-the-ear hearing aid. The patch means 112 comprises a rectangular section of material 114, similar to the material forming the headband 10, dimensioned to overly an intermediate portion of either side surface of the headband. The section 114 is transversely slit intermediate its width and in longitudinal spaced-apart relation, as at 116, for receiving respective end portions of an elongated strip 118 of similar material extending at its respective end portions beyond the ends of the section 114. The strip 118, in combination with the section 114, forms a loop 120 which at least partially surrounds an oscillator or hearing aid. Velcro on the headband 110, section 114 and strip 118 secure the patch 112 and its supported component to the headband at a selected location.

Figure 7:
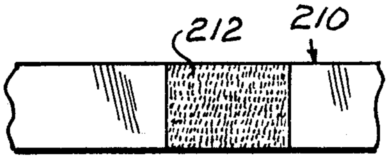
FIG. 7 is a fragmentary elevational of the headband to another scale.
Figure 3:
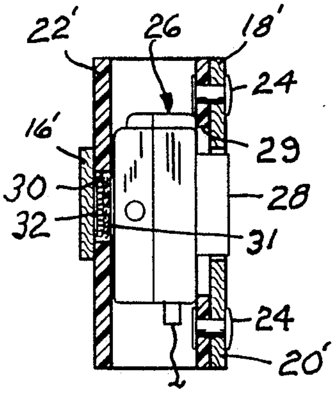
FIG. 3 is a vertical cross section view to a larger scale taken substantially along the line 3—3 of FIG. 2.
Figure 4:
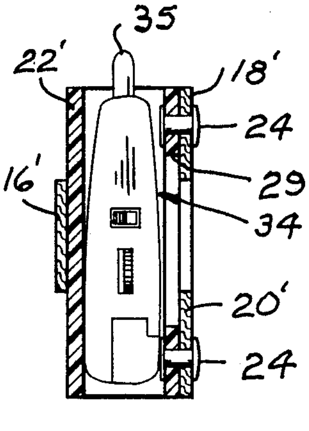
FIG. 4 is a view similar to FIG. 3 illustrating the positioning of a different type hearing aid.
Figure 8:
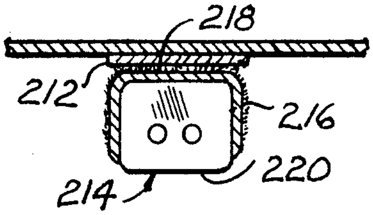
FIG. 8 is a horizontal sectional view similar to FIG. 6.

Referring also to FIGS. 7 and 8 the numeral 210 indicates a fragment of a headband having a section of self adhering patch material 212, such as Velcro, secured thereto for supporting a bone oscillator 214. A section of the Velcro material 216 is wrapped around the back surface 218 of the bone oscillator, opposite its face or bone contacting surface 220 and the two adjacent side surfaces. The material covering the back surface 218 is then placed in contact with the patch 212 thus securing the bone oscillator in a desired location for contact with the user's skull.

OPERATION

Since the length of the headband 10 will be determined by the head size of the user, the head is measured prior to construction of the headband and to determine the position of the hearing aid supporting slits and strips. A exact measurement is made from the forehead center to the mastoid bone on the right and left hand sides, respectively. Similarly, right and left measurements are made from the mastoid bone to the center of the nape of the neck. These four measurements when added together determine the length of the headband 10, allowance being made for the headband end overlap. The position of the several slits 12–14 and 12'–14' is that distance from the center of the headband as measured to the mastoid bone on each side of the measured head.

When the hearing aid device is installed on the headband 10, as described herein, above the headband is placed on the head of the user under desired tension by the position of the end portions overlapping at the back of the head, thus positioning the respective supported hearing aid rearwardly of one or both ears of the user for conventional connection with ear plugs.

Obviously the invention is susceptible to changes or alterations without defeating its practicability. Therefore, we do not wish to be confined to the preferred embodiment shown in the drawings and described herein.

We claim:

1. A hearing aid support, comprising:

an elongated flexible headband having a length capable of surrounding a user's head from the forehead hairline across the position of the mastoid bones to the nape of the neck in end overlapping relation and having a width selected in accordance with the dimensions of a hearing aid to be supported;

means including a tube or patch strip securing a bone conduction oscillator or air receiver hearing aid to said headband in a manner for contact between the oscillator and the user's skull bone, said headband having a plurality of longitudinal parallel spaced-apart slits at the position of the mastoid bone forming a lateral strip on either side of a center strip, the tube being resilient, flexible and coextensive with the headband width and transversely threaded through the headband slits and gripped by the strips; and, a hearing aid unit within the bore of said tube.

2. The hearing aid support according to claim 1 and further including:

means anchoring the respective end portions of said tube with the lateral strips, respectively.

3. The hearing aid support according to claim 2 in which said lateral strips are interposed between the respective end portions of said tube and the head of the user and the wall of the tube is provided with an opening between the lateral strips exposing an adjacent portion of the hearing aid for intimate contact with the user's skull.

4. The hearing aid support according to claim 3 in which said tube is further characterized by an aperture in its wall diametrically opposite the opening and further including:

at least one section of material of predetermined thickness secured to the inner surface of the center strip in register with the tube aperture.

* * * * *